United States Patent [19]

Abreu et al.

[11] Patent Number: 5,726,411

[45] Date of Patent: Mar. 10, 1998

[54] METHOD AND APPARATUS FOR MAKING HOLES IN A WORKPIECE

[75] Inventors: Mario E. Abreu, Poway; Douglas C. Rawlins, Murrieta; Virendra M. Sood, Encinitas; James B. Sperling, El Cajon, all of Calif.

[73] Assignee: Solar Turbines Incorporated, San Diego, Calif.

[21] Appl. No.: 548,165

[22] Filed: Oct. 25, 1995

[51] Int. Cl.$^6$ .................................................. B23K 26/00
[52] U.S. Cl. .................................. 219/121.7; 219/121.71
[58] Field of Search ......................... 219/121.7, 121.71; 364/474.04, 474.08

[56] References Cited

U.S. PATENT DOCUMENTS

| | | | |
|---|---|---|---|
| 4,218,606 | 8/1980 | Whitman, III | 219/121.6 |
| 4,257,559 | 3/1981 | Noren | 239/283 |
| 4,297,559 | 10/1981 | Whitman, III | 219/121.6 |
| 5,010,224 | 4/1991 | Shirey et al. | 219/69.17 |
| 5,117,087 | 5/1992 | Baker et al. | 219/121.71 |
| 5,181,379 | 1/1993 | Wakeman et al. | 60/261 |
| 5,293,778 | 3/1994 | Schneiter | 73/198 |
| 5,365,033 | 11/1994 | Williams | 219/121.71 |

FOREIGN PATENT DOCUMENTS

| | | |
|---|---|---|
| 0356063 | 2/1990 | European Pat. Off. . |
| 0 417 917 | 8/1990 | European Pat. Off. . |
| 0547914 | 6/1993 | European Pat. Off. . |
| 127357 | 9/1977 | Germany . |
| 1-77748 | 3/1989 | Japan . |
| 2103834 | 6/1982 | United Kingdom . |

*Primary Examiner*—Geoffrey S. Evans
*Attorney, Agent, or Firm*—Larry G. Cain

[57] ABSTRACT

The present method of making a workpiece having a plurality of holes defined therein includes the plurality of holes defining a specific flow at a specific flow condition. The method of making the plurality of holes includes generally the steps of forming a first portion of holes having a first preestablished hole cross-sectional area being defined by a predetermined flow characteristic value of the first preestablished hole cross-sectional area at the specific flow condition; a cavity being formed; positioning a flow establishing device in communication with the cavity; positioning a flow measuring device in operative relationship with the flow establishing device; actuating the flow establishing device and establishing a flow through the first portion of holes; monitoring the flow; comparing the flow with the predetermined flow characteristic value; determining a flow requirement of a second portion of holes based on an accumulative predetermined flow characteristic value of the first and second portions of holes and the measured flow of the first portion of holes; conforming the forming device to a second predetermined hole cross-sectional area and forming the second portion of said plurality of holes having the second predetermined hole cross-sectional area; and repeating the aforementioned steps successively for the remaining portions of the plurality of holes until the required number of holes in the workpiece have been formed.

10 Claims, 8 Drawing Sheets

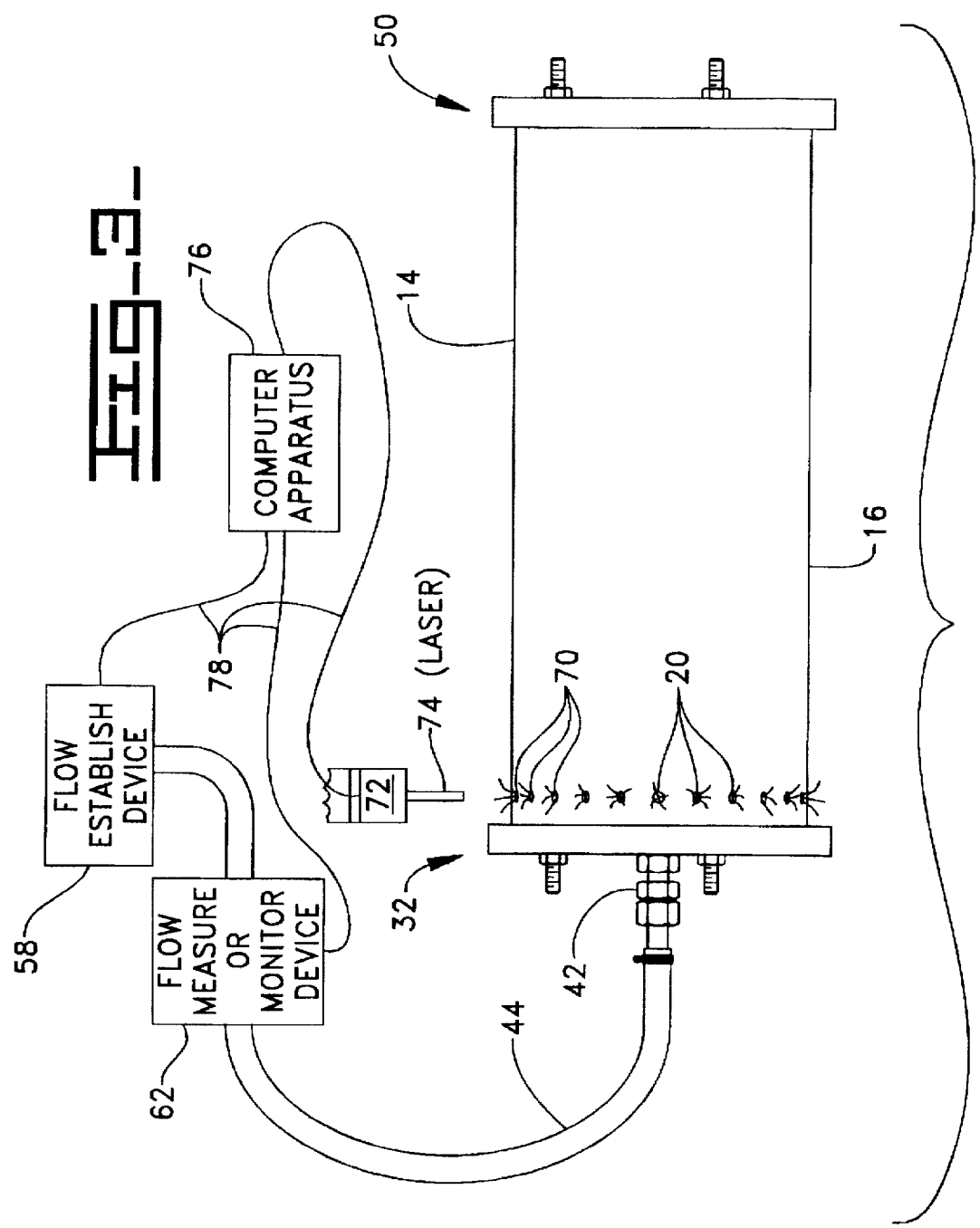

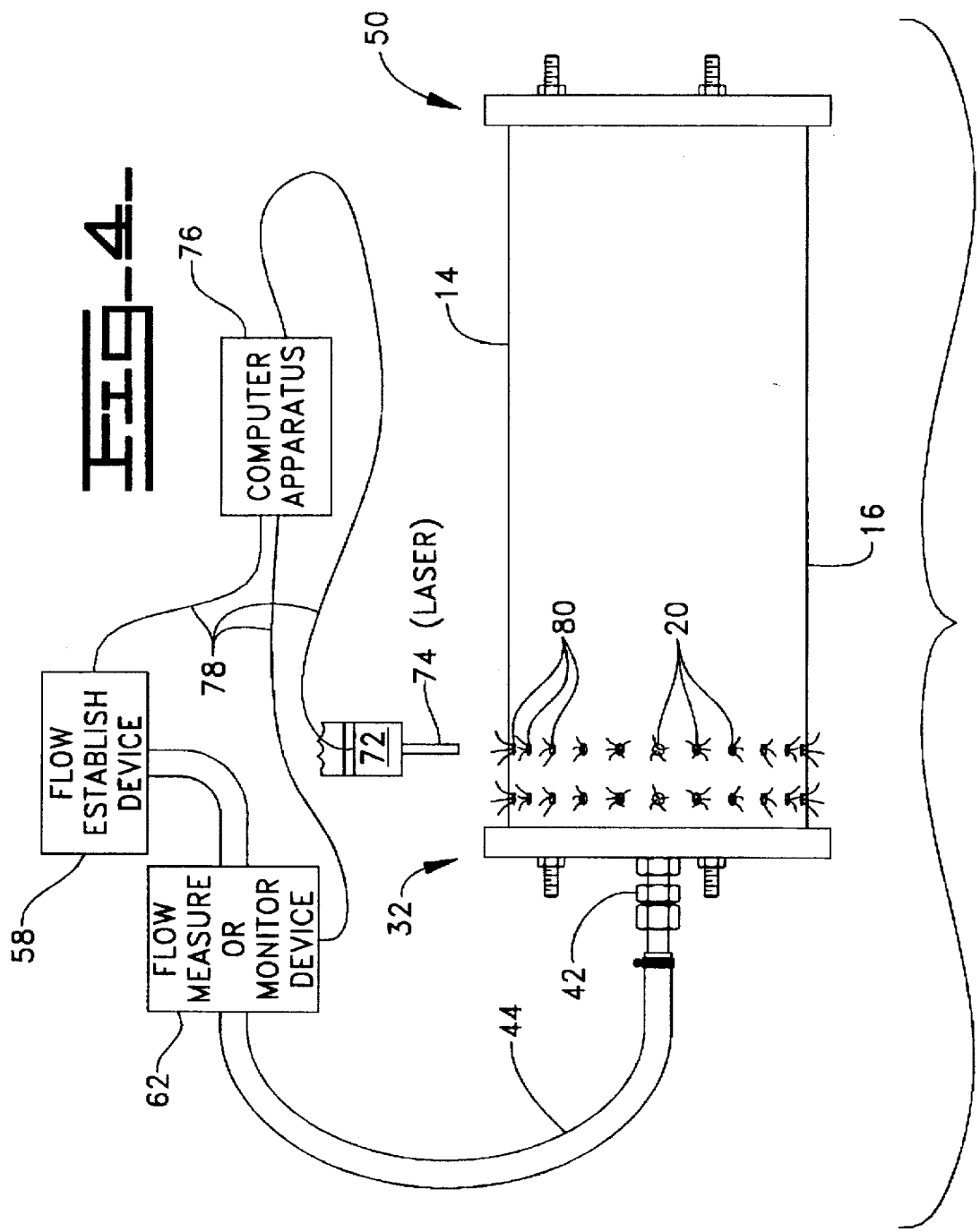

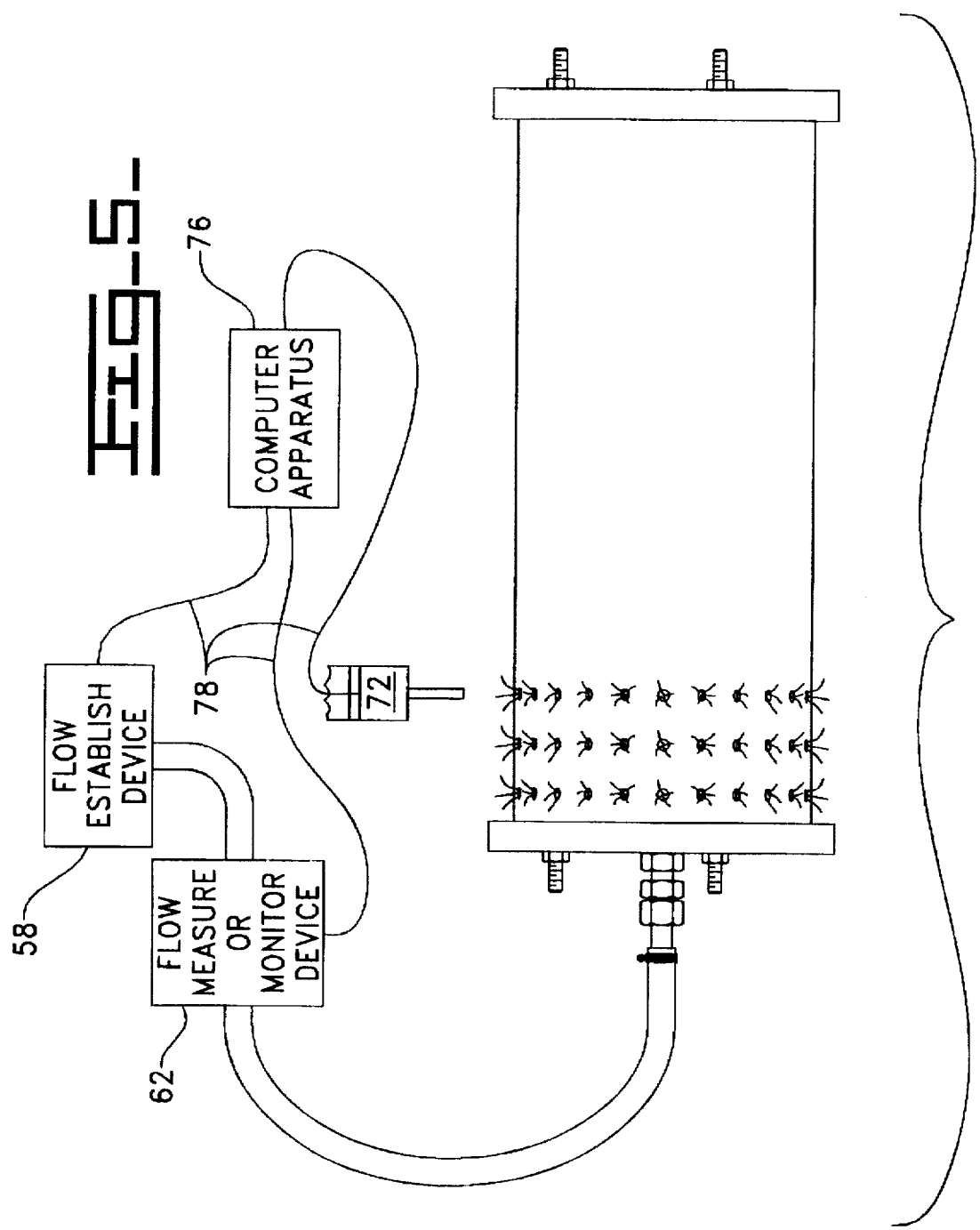

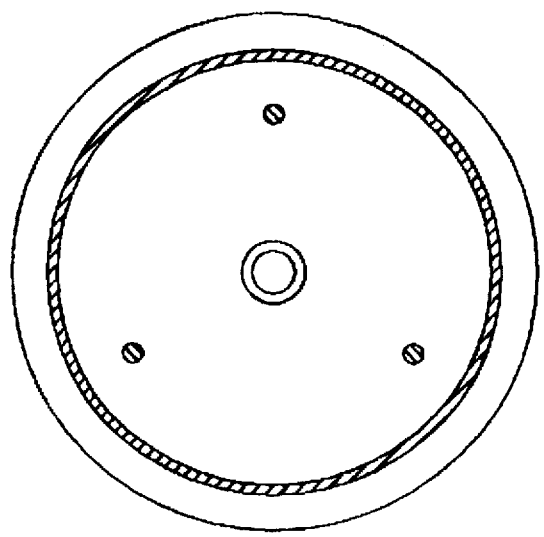
Fig_6_

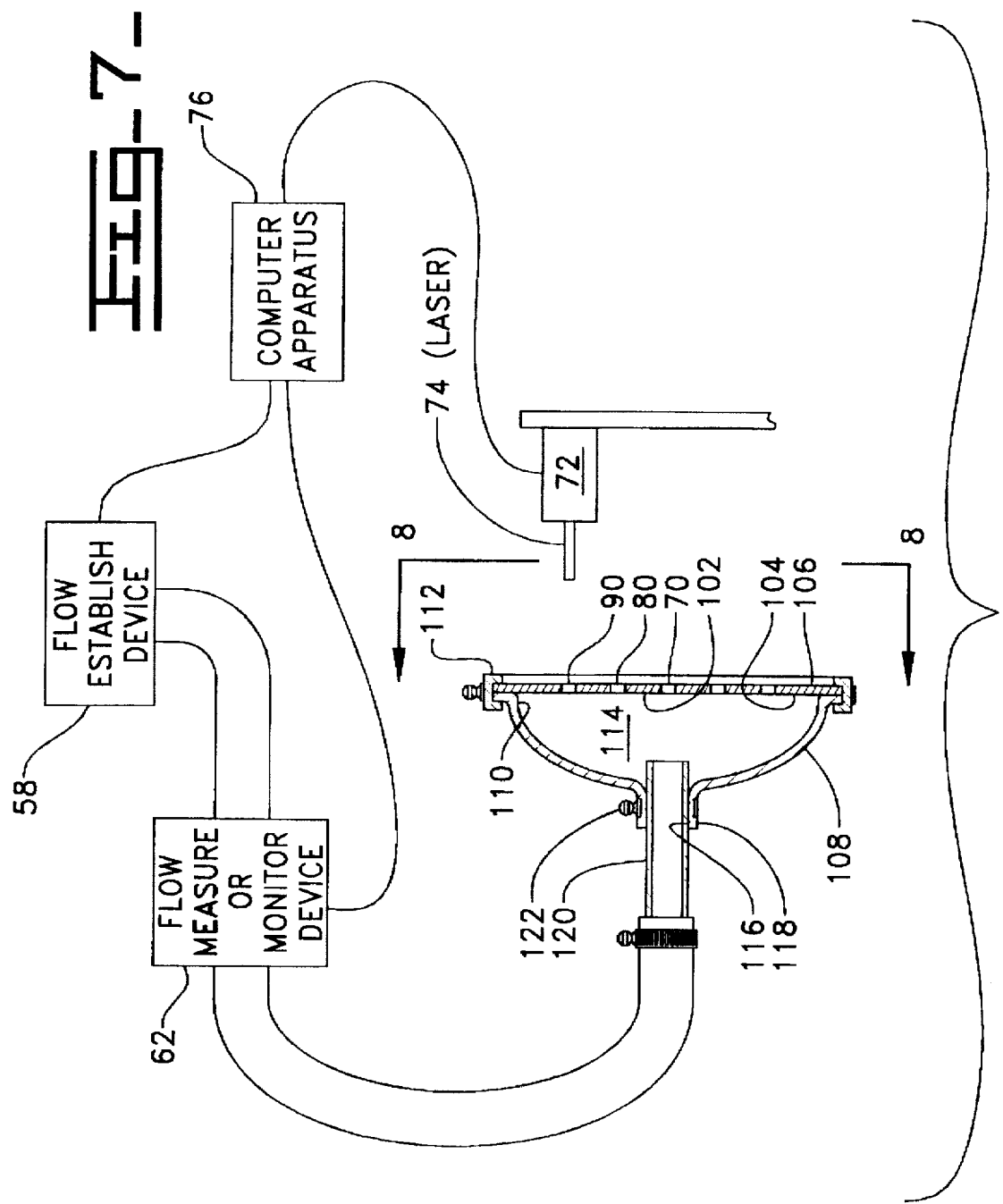

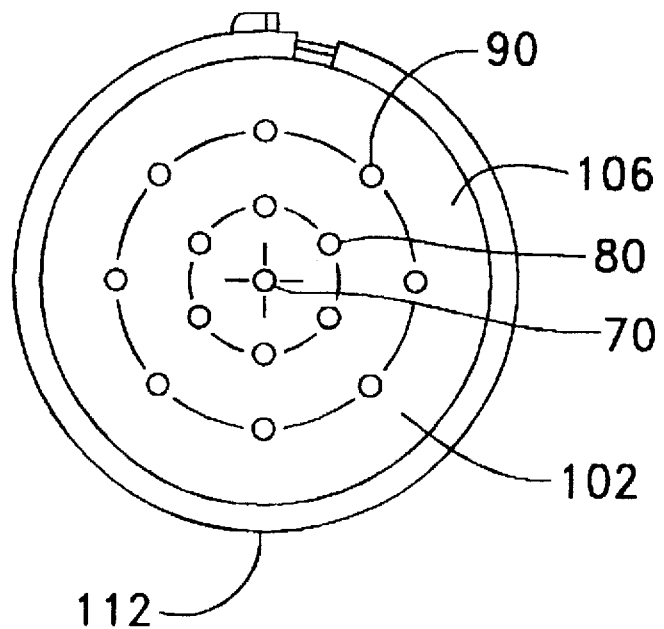

METHOD AND APPARATUS FOR MAKING HOLES IN A WORKPIECE

TECHNICAL FIELD

This invention relates generally to a method of making holes in a workpiece and monitoring a flow through the holes to establish a precise flow of fluid through the holes.

BACKGROUND ART

In the production of components for a gas turbine engine, it is often essential that a flow of fluid pass through holes in various components for various purposes such as cooling, metering, etc. The flow of fluid through such components is generally desirable to be of a predetermined value. Conventionally, the holes are formed (such as by laser drilling) using specific process parameters and, after all of the holes have been produced, the overall flow of fluid though the holes is measured to determine if the flow of fluid falls within the predetermined value. Past experience has shown that such a process can typically achieve a tolerance of plus or minus 10 percent.

Others have attempted to improve on the method of making such holes and controlling the process to a closer or more precise tolerance. For example, as disclosed in U.S. Pat. No. 5,117,087, issued to George E. Baker and Edward C. Williams on May 26, 1992 an attempt was made to improve on the 10 percent tolerance. The patent discloses a process for making a plurality of holes in a component by laser drilling where the finished component is intended to have a fluid flow through the apertures which is as close as possible to a predetermined value. The process includes the making of one or a series of apertures within a row, measuring the flow therethrough, comparing the flow with the predetermined value and adjusting the process for making the remainder of the apertures in that row.

In actual practice the process included a laser drilling component, an air supply being connected to a sealing mechanism which is placed over the most recently made hole or holes and a flow meter. After a hole was made the sealing mechanism was sealingly placed over only the most recently made hole or holes and the flow meter was used to determine the predetermined flow through the opening, so that, the laser drilling component can be adjusted to form an other hole through which the predetermined flow will more closely meet the predetermined value.

In reality the process failed to improve on the 10 percent tolerance, the process was not cost effective and generally failed to be a useful manufacturing process.

The present invention is directed to overcoming one or more of the problems as set forth above.

DISCLOSURE OF THE INVENTION

In one aspect of the present invention, a method of making an apparatus having a plurality of holes defined therein is included. The plurality of holes define a specific flow at a specific flow condition, the apparatus is defined by a first surface and a second surface. The second surface is spaced from the first surface and the plurality of holes extend between the first surface and the second surface. The method of making the plurality of holes includes the following steps. Forming a first portion of the plurality of holes with a forming device. The first portion of the plurality of holes have a first preestablished hole cross-sectional area being defined by a predetermined flow characteristic value of the first preestablished hole cross-sectional area at the specific flow condition. Forming a cavity about one of the first surface and the second surface. Positioning a flow establishing device in communication with the cavity. Positioning a flow measuring device in operative relationship with the flow establishing device. Actuating the flow establishing device and establishing a flow through the first portion of the plurality of holes. The flow is directed from the one of the first surface and the second surface. Monitoring the flow and comparing the flow with the predetermined flow characteristic value. Determining a flow requirement of a second portion of the plurality of holes based on a predetermined flow characteristic value of the first and second portions of the plurality of holes and the measured flow of the first portion of the plurality of holes. Conforming the forming device to a second predetermined hole cross-sectional area, the second predetermined hole cross-sectional area being determined from determining a flow requirement of a second portion of the plurality of holes based on a predetermined flow characteristic value of the first and second portions of the plurality of holes and the measured flow of the first portion of the plurality of holes. Forming the second portion of the plurality of holes having the second predetermined hole cross-sectional area.

In another aspect of the invention an apparatus for making a workpiece having a plurality of holes is defined. The plurality of holes define a specific flow at a specific flow condition. The workpiece is defined by a first surface and a second surface. The second surface is spaced from the first surface and the plurality of holes extend between the first surface and the second surface. The apparatus for making the plurality of holes includes. A sealing device operatively connected to the workpiece. A cavity is formed between the sealing device and the workpiece. A forming device forms a first portion of the plurality of holes. The first portion of the plurality of holes have a first preestablished hole cross-sectional area being defined by a predetermined flow characteristic value of the first preestablished hole cross-sectional area at the specific flow condition. A flow establishing device is positioned in communication with the cavity. A flow measuring device is operatively interposed the flow establishing device and the workpiece. A computer apparatus is operatively connected to the flow establishing device, the flow measuring device and the forming device. The computer apparatus actuates the flow establishing device and establishes a flow through the first portion of the plurality of holes. The flow being directed from the one of the first surface and the second surface. The computer apparatus interprets a signal from the flow measuring device and the computer apparatus interpreting the signals to compare the flow with the predetermined flow characteristic value and determines a flow requirement of a second portion of the plurality of holes based on an accumulative predetermined flow characteristic value of the first and second portions of the plurality of holes and the measured flow of the first portion of the plurality of holes. The computer apparatus conforms the forming device to a second predetermined hole cross-sectional area. The second predetermined hole cross-sectional area is determined by the computer apparatus. The forming device, after being conformed, forms the second portion of the plurality of holes to have the second hole predetermined cross-sectional area.

BRIEF DESCRIPTION OF THE DRAWINGS

FIG. 3 is a partially completed view of the workpiece and the method and apparatus for making the holes in the workpiece embodying the present invention as the method has progressed between start to finish;

FIG. 4 is another partially completed view of the workpiece and the method and apparatus for making holes in the workpiece embodying the present invention as the method has progressed further between start to finish;

FIG. 5 is another partially completed view of the workpiece and the method and apparatus for making holes in the workpiece embodying the present invention as the method has progressed further between start to finish;

FIG. 6 is a sectional end view through the workpiece embodying the present invention as taken along lines 6—6 of FIG. 1;

FIG. 7 is a partially sectioned side view of the workpiece and the method and apparatus for making holes embodying the present invention of an alternate component as the method has progressed between start to finish; and FIG. 8 is an end view of the alternate component embodying the present invention of the alternate component.

BEST MODE FOR CARRYING OUT THE INVENTION

Figure 1:
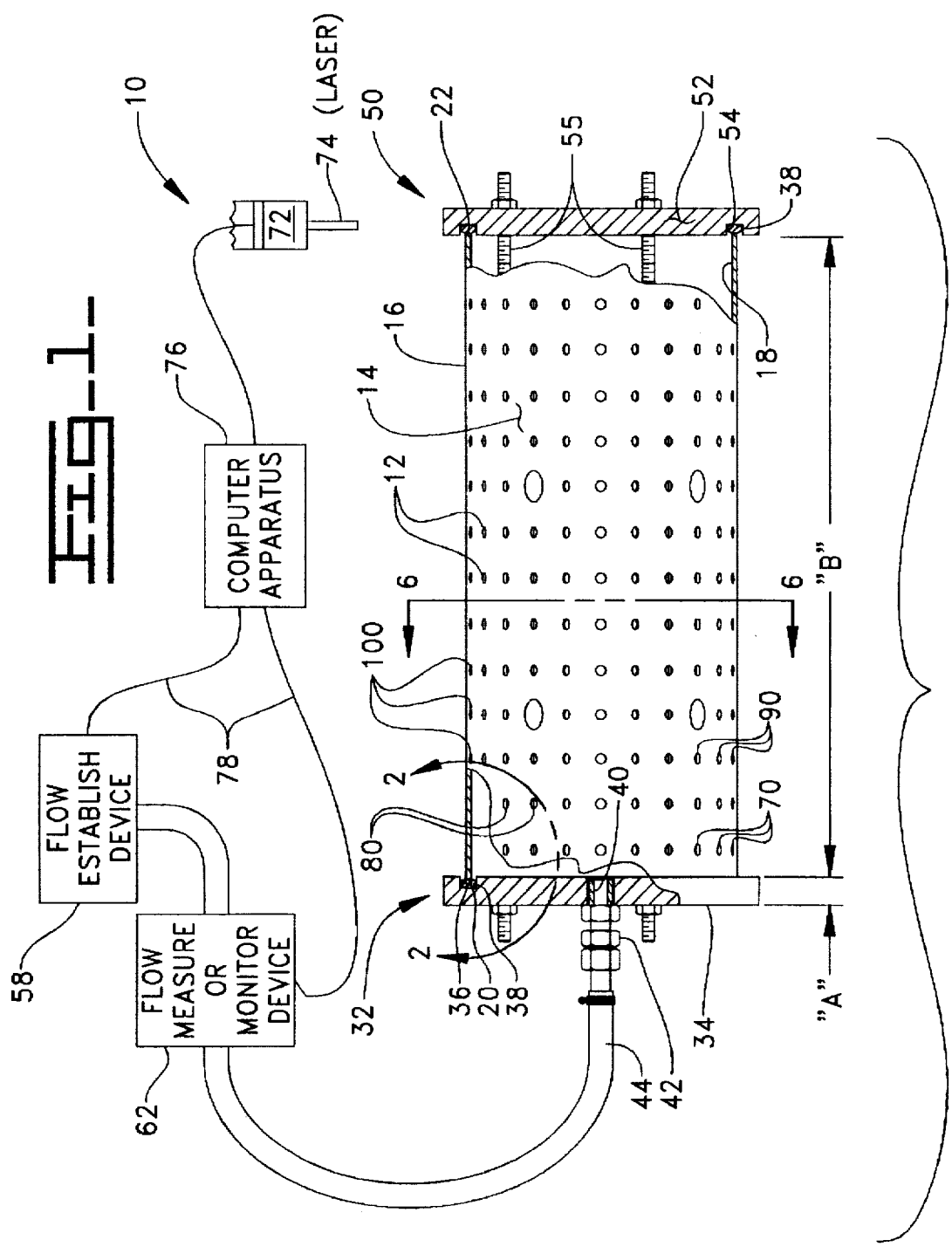
FIG. 1 is a partially sectioned view of the method and apparatus for making holes in a workpiece embodying the present invention.
Figure 2:
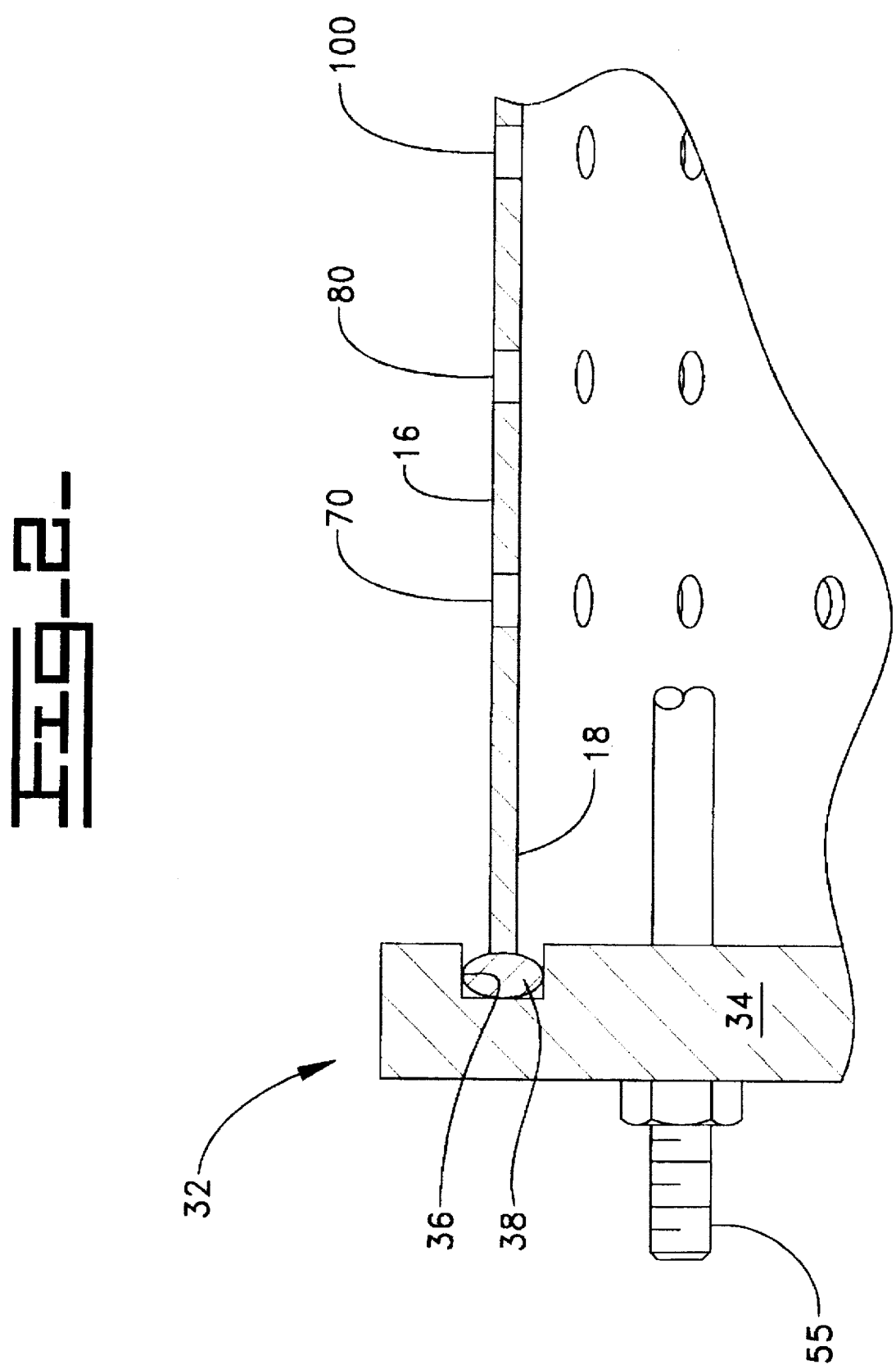
FIG. 2 is an enlarged sectional view of a portion of the method and apparatus for making holes taken alone line 2 of FIG. 1.

Referring to FIG. 1, 2 and 6, a method and apparatus 10 for making and monitoring a plurality of holes 12 in a workpiece 14 is shown. The workpiece 14 of this example is used in a gas turbine engine, not shown. The workpiece in reality is a combustion liner 14 and has a generally cylindrical configuration. The combustion liner 14 includes an outer surface 16 being spaced from an inner surface 18 by a preestablished thickness. The combustor liner 14 further includes an inlet or first end 20 and an outlet or second end 22. The first end 20 is spaced from the second end 22 by a predetermimed axial distance, designated as "A". A sealing means 30 is positioned at each of the first end 20 and the second end 22. In this application, the sealing means 30 includes a first sealing device 32 positioned at the first end 20. The first sealing device 32 includes a plate 34 having an o'ring groove 36 therein. An o'ring seal 38 is positioned within the groove 36 and the first end 20 of the workpiece 14 is sealingly positioned therein. The first sealing device 32 further include an access hole 40 having a raised portion extending thereabout. A fitting 42 of conventional design has one end positioned within the hole 40 and the other end attached to a tube 44 in a conventional manner. The fitting 42 is of such a design in that the plate 34 and the tube 44 are rotatable with respect of one to the other.

The sealing means 30 further includes a second sealing device 50. The second sealing device 50 includes a plate 52 having an o'ring groove 54 therein. Another o'ring seal 38 is positioned within the groove 54 and the second end 22 of the workpiece 14 is sealingly positioned therein. The plates 34,52 are tensioned against the ends 20,22 of the combustor liner 14 by a plurality of threaded rods 55 of conventional construction.

The workpiece 14 and the sealing means 30 form a cavity 56. In this application the cavity 56 is interposed the first sealing device 32, the workpiece 14 and the second sealing device 50. A flow establishing device 58 is positioned in communication with the cavity 56 and a flow measuring or monitoring device 62 is positioned in operative relationship with the flow establishing device 58, which in this application is interposed the flow establishing device 58 and the workpiece 14. The flow establishing device 58, which in this application is an air compressor is positioned in operative communication with the tube 44. As an alternative, the flow establishing device 58 could be a vacuum device rather than an air compressor.

In actual practice, each of the first end 20 and the second end 22 extend axially into the corresponding o'ring groove 36,54 along the axial predetermined distance "A" and determine a working distance between the first end 20 and the second end 22 of a predetermined distance, designated by "B".

As shown in FIG. 3, a first row or a first portion 70 of the plurality of holes 12 are axially spaced from the first end 20 a preestablished distance and is made with a formed device 72 along the entire cylindrical configuration of the workpiece 14. The first row 70 of the plurality of holes 12 are made to have a first preestablished hole cross-sectional area being defined by a predetermined flow characteristic value at a specific flow condition. In this application the forming device 72 used to make the plurality of holes 12 is a conventional laser drilling device 74. After the first row 70 of the plurality of holes 12 has been made the flow establishing device 58 is actuated by a computer apparatus 76 and establishes a flow through the first row 70 of the plurality of holes 12. The computer apparatus is operatively connected to the flow establishing device 58, the flow monitoring device 62 and the forming device 72 by a plurality of wires 78. In this application, the flow is directed from the inner surface 18 through the thickness of the combustor liner 14 to the outer surface 16. The flow is monitored by the flow monitoring device 62 and is compared with the predetermined flow characteristic value. In this application, the comparison is made within the computer apparatus 76. The computer apparatus 76, in this application is a portable computer but could be a stationary fixed computer, is in communication with a signal from the flow monitoring device 62 and, if necessary, will send an adjusting signal to the laser drilling device 74. If the comparison of the predetermined flow characteristic value is substantially the same as the monitored flow characteristic value no change to the forming device 72 will be required. However; if the comparison of the predetermined flow characteristic value is not substantially the same as the monitored flow characteristic value a change to the forming device 72 will be required. After the actual predetermined flow characteristic value for the first row 70 of the plurality of holes 12 has been established it is necessary to determine a flow requirement of a second row or portion 80 of the plurality of holes 12 based on an other predetermined flow characteristic value of the first and second rows 70,80 of the plurality of holes 12 and the measured flow of the first row 70 of the plurality of holes 12. For example, if the monitored flow characteristic value is too large the resulting size or area formed by the forming device 72 will need to be decreased or if the monitored flow characteristic value is too small the resulting size or area formed by the forming device 72 will need to be increased. In a further example, if the monitored flow characteristic value is substantially identical, then, the size or area formed by the forming device 72 will not need correction. Thus, in order to conform the forming device 72 to a second predetermined hole cross-sectional area, the second predetermined hole cross-sectional area and the results of the monitored flow characteristic value from the first row 70 of the plurality of holes 12 must be taken into consideration and the results therefrom used to determine the second predetermined hole cross-sectional area.

As shown in FIG. 4, after making the necessary adjustments, if required, the second row 80 of said plurality of holes 12 is axially spaced from the first end 20 a preestablished distance and is made with the formed device 72 along the entire cylindrical configuration of the workpiece 14. The second row 80 of the plurality of holes 12 has the second predetermined hole cross-sectional area. Again after the second row 80 of the plurality of holes 12 has been made the flow establishing device 58 is actuated and establishes a flow through the first row 70 and the second row 80 of the plurality of holes 12. The flow is again monitored by the monitoring device 62 and is compared with the predetermined flow characteristic value of the first row 70 and the second row 80. If the comparison of the accumulative predetermined flow characteristic value is substantially the same as the monitored flow characteristic value no change to the forming device will be required. However; if the comparison of the accumulative predetermined flow characteristic value is not substantially the same as the monitored flow characteristic value a change to the forming device 72 will be required. After the actual predetermined flow characteristic value for the first row 70 and the second row 80 of the plurality of holes 12 has been established it is necessary to determine a flow requirement of a third row or portion 90 of the plurality of holes 12 based on an other accumulative predetermined flow characteristic value of the first, second and third rows 70,80,90 of the plurality of holes 12 and the measured flow of the first row 70 and the second row 80 of the plurality of holes 12. For example, if the monitored flow characteristic value is too large the resulting size or area formed by the forming device 72 will need to be decreased or if the monitored flow characteristic value is too small the resulting size or area formed by the forming device 72 will need to be increased. In a further example, if the monitored flow characteristic value is substantially identical, then, the size or area formed by the forming device 72 will not need correction. Thus, in order to conform the forming device 72 to a third predetermined hole cross-sectional area, the third predetermined hole cross-sectional area and the results of the monitored flow characteristic value from the first row 70 and the second row 80 of the plurality of holes 12 must be taken into consideration and the accumulative results therefrom used to determine the third predetermined hole cross-sectional area.

As shown in FIG. 5, after making the necessary adjustments, if required, the third row 90 of said plurality of holes 12 is axially spaced from the first end 20 a preestablished distance and is made with the formed device 72 along the entire cylindrical configuration of the workpiece 14. The third row 90 of the plurality of holes 12 has the third predetermined hole cross-sectional area. Again after the third row 90 of the plurality of holes 12 has been made the flow establishing device 58 is actuated and establishes a flow through the first row 70, the second row 80 and the third row 90 of the plurality of holes 12. The flow is again monitored by the monitoring device 62 and is compared with the predetermined flow characteristic value of the first row 70, the second row 80 and the third row 90. If the comparison of the predetermined flow characteristic value is substantially the same as the monitored flow characteristic value no change to the forming device 72 will be required. However; if the comparison of the predetermined flow characteristic value is not substantially the same as the monitored flow characteristic value a change to the forming device 72 will be required. After the actual predetermined flow characteristic value for the first row 70, the second row 80 and the third row 90 of the plurality of holes 12 has been established it is necessary to determine an accumulative flow requirement of an other row or portion 100 of the plurality of holes 12 based on an other predetermined flow characteristic value of the first, second, third and the other rows 70,80,90,100 of the plurality of holes 12 and the measured flow of the first row 70, the second row 80 and the third row 90 of the plurality of holes 12. For example, if the monitored flow characteristic value is too large the resulting size or area formed by the forming device 72 will need to be decreased or if the monitored flow characteristic value is too small the resulting size or area formed by the forming device 72 will need to be increased. In a further example, if the monitored flow characteristic value is substantially identical, then, the size or area formed by the forming device 72 will not need correction. Thus, in order to conform the forming device 72 to the other predetermined hole cross-sectional area, the other predetermined hole cross-sectional area and the results of the monitored flow characteristic value from the first row 70, the second row 80, the third row 90 and the other 100 of the plurality of holes 12 must be taken into consideration and the accumulative results therefrom used to determine the other predetermined hole cross-sectional area.

The process as established above is continued until all of the rows or portion of the plurality of holes 12 are formed within the workpiece 14. As shown in FIG. 1, not all of the plurality of precision holes are of the same size, such as diameter or area, in fact the holes can be of some configuration other than a circular shape such as an ellipse or square. Furthermore, the angle through which the holes extend between the inner surface 18 and the outer surface 16 of the workpiece 14 may also vary.

As a further alternative, only a portion of the plurality of holes 12 within a predetermined row may be formed during the initial forming of the workpiece 14. And, the remainder of the plurality of holes 12 within the predetermined row may be formed after the inital holes in the predetermined row have been formed.

As a further alternative, shown in FIGS. 7 and 8, the method 10 for making an apparatus having precision holes 12 could be use in conjunction with making the plurality of holes 12 in a plate 102 rather than a cylindrical object such as the combustor liner 14. The plate 102 would have a first surface 104 spaced from a second surface 106 by a material thickness. For example, the sealing means 30 would include an other sealing device 108 having a generally cup shaped configuration. The sealing device 108 would be made of a flexible material, such as rubber, and has a rim portion 110 positioned in sealing contact with the first surface 104 of the plate 102. A clamp 112 of suitable construction would be used to attach the sealing device 108 to the plate 102 forming a cavity 114 interposed the sealing device 108 and the plate 102. The sealing device 108 further includes an access hole 116 having a raised portion 118 extending thereabout. A tube 120 is positioned within the hole 116 and a clamp device 122 is positioned about the raised portion 118 and sealingly attaches the tube 120 within the access hole 116. The operations as defined above would be used to form the first portion 70, the second portion 80 and the third portion 90 of the plurality of precision holes 12 within the plate 102. The position and operation of the flow establishing device 58, the flow monitoring device 62, the computer apparatus 76 and the forming device 72 would be as described earlier.

In this application, the flow establishing device 58 will function to push the flow from the inner surface 18 through the thickness of the material toward the outer surface 16. As an alternative, the flow establishing device 58 could function to pull the flow from the outer surface 16 through the thickness of the material toward the inner surface 18.

Industrial Applicability

In operation, the workpiece 14 requiring the plurality of holes 12 has the sealing means 30 attached thereto. The first sealing device 32 is positioned about the first end 20 of the workpiece 14 and is sealingly attached thereto by the combination of the o"ring seal 38 and the plurality of threaded rods 55. The second sealing device 50 is positioned about the second end 22 of the workpiece 14 and is sealingly attached thereto by the combination of the o"ring seal 38 and the plurality of threaded rods 55.

The fitting 42 is positioned within the hole 40 and the other end is attached to the tube 44. The tube 44 is positioned in communication with the flow monitoring device 62 and the flow establishing device 58. A portion of the plurality of wires 78 communicate from the flow establishing device 58 and the flow monitoring device 62 to the computer apparatus 76. And, another portion of the plurality of wires 78 communicate from the forming device 72 to the computer apparatus 76.

After the first portion 70 of the plurality of precision holes 12 are formed in the workpiece 14, a signal is sent from the computer apparatus 76 to the flow establishing device 58 causing a specific flow condition through the preestablished hole cross-sectional area of the first portion 70 which has the defined predetermined flow characteristic value of the first preestablished hole cross-sectional area. The flow monitoring device 62 monitors the specific flow condition and sends a signal to the computer apparatus 76. The signal is interpreted by the computer apparatus 76 to determine if an adjustment is required to the laser drilling device 74. If the predetermined flow characteristic value is correct, no adjustment will be required. If an adjustment is required to compensate for an incorrect flow characteristic value a signal is sent to the forming device 72 and the predetermined hole cross-sectional area of the second portion 80 of the plurality of precision holes 12 is varied to compensate for the incorrect flow characteristic value of the first portion 70 of the plurality of holes 12. For example, if the measured flow value is too small the hole cross-sectional area of the second portion 80 is increased or if the measured flow value is too large the hole cross-sectional area of the second portion 80 of the plurality of holes 12 is decreased.

After the second portion 80 of the plurality of precision holes 12 have been formed in the workpiece 14, a signal is sent from the computer apparatus 76 to the flow establishing device 58 causing a specific flow condition through the preestablished hole cross-sectional area of the first portion 70 and the second portion 80 of the plurality of holes 12 which has the defined predetermined second or accumulative flow characteristic value of the first preestablished hole cross-sectional area and the adjusted hole cross-sectional area of the second portion 80. The flow monitoring device 62 monitors the accumulative specific flow condition and sends a signal to the computer apparatus 76. The signal is interpreted by the computer apparatus 76 to determine if an other adjustment is required to the laser drilling device 74. If the predetermined flow characteristic value is correct, no adjustment will be required. If an adjustment is required to compensate for an other incorrect flow characteristic value a signal is sent to the forming device 72 and the predetermined hole cross-sectional area of the third portion 90 of the plurality of precision holes 12 is varied to compensate for the incorrect flow characteristic value of the first portion 70 and the second portion 80. For example, if the flow value is too small the hole cross-sectional area of the third portion 90 is increased or if the flow value is too large the hole cross-sectional area of the third portion 90 is decreased.

After the third portion 90 of the plurality of precision holes 12 have been formed in the workpiece 14, a signal is sent from the computer apparatus 76 to the flow establishing device 58 causing specific flow condition through the preestablished hole cross-sectional area of the first portion 70, the second portion 80 and the third portion 90 which has the defined predetermined third flow characteristic value of the first preestablished hole cross-sectional area, the adjusted hole cross-sectional area of the second portion 80 and the adjusted hole cross-sectional area of the third portion 90. The flow monitoring device 62 monitors the accumulative flow and sends a signal to the computer apparatus 76. The signal is interpreted by the computer apparatus 76 to determine if an other adjustment is required to the laser drilling device 74. If the measured accumulative predetermined flow characteristic value is correct, no adjustment will be required. If an adjustment is required to compensate for an other incorrect flow characteristic value a signal is sent to the forming device 72 and the predetermined hole cross-sectional area of an other portion 100 of the plurality of holes 12 is varied to compensate for the incorrect flow characteristic value of the first portion 70, the second portion 80 and the third portion 90 of the plurality of holes 12. For example, if the flow value is too small the hole cross-sectional area of the other portion 100 is increased or if the flow value is too large the hole cross-sectional area of the other portion 100 is decreased.

Thus, after each operation of the forming of the portions 70,80,90,100 of the plurality of holes 12 the combined or accumulative flow characteristic value is monitored, compared to that of the predetermined flow characteristic value of the combined or accumulative respective portions 70,80, 90,100 of the plurality of holes 12 and the appropriate adjustment or conformance is made to more accurately control the combined flow characteristic value of the plurality of holes 12.

The method and apparatus 10 of making a workpiece 14 having a plurality of holes 12 is more accurately constructed since the combined or accumulative flow characteristic of each of the portions 70,80,90,100 of the plurality of holes 12 are formed, monitored to determine the combined or accumulative flow value and the hole cross-sectional area of the next portion 80,90,100 of the plurality of holes is adjusted to more accurately define the predetermined flow characteristic value of the combined or accumulative portions 70,80,90, 100 of the plurality of holes.

Other aspects, objects and advantages of this invention can be obtained from a study of the drawings, the disclosure and the appended claims.

We claim:

1. A method of making a workpiece having a plurality of holes defined therein and monitoring a flow through said plurality of holes with a unitary apparatus, said plurality of holes defining a specific flow at a specific flow condition, said workpiece being defined by a first surface and a second surface, said second surface being spaced from said first surface, said plurality of holes extending between said first surface and said second surface, said method of making and monitoring the plurality of holes including the steps of:

a) forming a first row of said plurality of holes with a forming device, said first row of said plurality of holes having a first preestablished hole cross-sectional area being defined by a predetermined flow characteristic value of the first preestablished hole cross-sectional area at said specific flow condition;

b) forming a cavity about one of said first surface and said second surface;

c) positioning a flow establishing device in communication with said cavity;

d) positioning a flow monitoring device in operative relationship with said flow establishing device;

e) actuating said flow establishing device and establishing a flow through said first row of said plurality of holes, said flow being directed from said one of said first surface and said second surface;

f) monitoring said flow;

comparing said flow with the predetermined flow characteristic value;

h) determining a flow requirement of a second row of said plurality of holes based on a predetermined flow characteristic value of said first and second rows of said plurality of holes and the measured flow of said first row of said plurality of holes:

i) conforming said forming device to a second predetermined hole cross-sectional area, said second predetermined hole cross-sectional area being determined from step h; and j) forming the second row of said plurality of holes having said second predetermined hole cross-sectional area.

2. The method of making and monitoring a workpiece having a plurality of holes defined therein of claim 1 wherein said steps further include:

a) actuating said flow establishing device creating an accumulative flow through said first and second rows of said plurality of holes, said accumulative flow being directed from said one of said first surface and said second surface;

b) monitoring said flow;

c) comparing said flow with the predetermined flow characteristic value of said first and second rows of said plurality of holes;

d) determining a flow requirement of a third row of said plurality of holes based on a predetermined flow characteristic value of said first, second and third rows of said plurality of holes and the measured flow of said first and second rows of said plurality of holes:

e) conforming said forming device to a third predetermined hole cross-sectional area, said third predetermined hole cross-sectional area being determined from step d; and f) forming the third row of said plurality of holes.

3. The method of making and monitoring a workpiece having a plurality of holes defined therein of claim 2 wherein said steps further include:

a) actuating said flow establishing device creating an other accumulative flow through a combined total of previously made rows of said plurality of holes, said another accumulative flow being directed from said one of said first surface and said second surface;

b) monitoring said flow;

c) comparing said flow with an other predetermined flow characteristic value;

d) determining a flow requirement of an other row of said plurality of holes based on a predetermined flow characteristic value of said combined total of previously made rows and the other row of said plurality of holes and the measured flow of said combined total of previously made rows of said plurality of holes:

e) conforming said forming device to an other predetermined hole cross-sectional area, said other predetermined hole cross-sectional area being determined from step d; and f) forming the other row of said plurality of holes.

4. An unitary apparatus for making a workpiece having a plurality of holes defined therein and monitoring a flow through said plurality of holes, said plurality of holes defining a specific flow at a specific flow condition, said workpiece being defined by a first surface and a second surface, said second surface being spaced from said first surface, said plurality of holes extending between said first surface and said second surface, said apparatus for making the plurality of holes including:

a sealing device being operatively connected to the workpiece and forming a cavity between the sealing device and the workpiece;

a forming device for forming a first row of said plurality of holes, said first row of said plurality of holes having a first preestablished hole cross-sectional area being defined by a predetermined flow characteristic value of the first preestablished hole cross-sectional area at said specific flow condition;

a flow establishing device being positioned in communication with said cavity;

a flow monitoring device being operatively interposed the flow establishing device and the workpiece;

a computer apparatus being operatively connected to said flow establishing device, said flow monitoring device and said forming device, said computer apparatus actuating said flow establishing device and establishing a flow through said first row of said plurality of holes, said flow being directed from said one of said first surface and said second surface and said computer apparatus interpreting a signal from the flow monitoring device;

said computer apparatus interpreting said signals to compare said flow with the predetermined flow characteristic value and determine a flow requirement of a second row of said plurality of holes based on an accumulative predetermined flow characteristic value of said first and second rows of said plurality of holes and the measured flow of said first row of said plurality of holes:

said computer apparatus conforming said forming device to a second predetermined hole cross-sectional area, said second predetermined hole cross-sectional area being determined by said computer apparatus; and said forming device, after being conformed, forming the second row of said plurality of holes having said second predetermined hole cross-sectional area.

5. The unitary apparatus for making a workpiece of claim 4 wherein said sealing device is removably connected to the workpiece.

6. The unitary apparatus for making a workpiece of claim 4 wherein said forming device is a laser drilling device.

7. The unitary apparatus for making a workpiece of claim 4 wherein said flow establishing device is a an air compressor.

8. The unitary apparatus for making a workpiece of claim 4 wherein said flow establishing device is a vacuum forming device.

9. The unitary apparatus for making a workpiece of claim 4 wherein said computer apparatus is a stationary computer.

10. The unitary apparatus for making a workpiece of claim 4 wherein said computer apparatus is a portable computer.

* * * * *